United States Patent [19]
Harrod

[11] Patent Number: 6,026,341
[45] Date of Patent: Feb. 15, 2000

[54] METHOD FOR DETECTING TRUCK DUMP OCCURRENCES

[75] Inventor: Gregory R. Harrod, Peoria, Ill.

[73] Assignee: Caterpillar Inc., Peoria, Ill.

[21] Appl. No.: 08/996,005

[22] Filed: Dec. 22, 1997

[51] Int. Cl.[7] ................................... G06F 19/00
[52] U.S. Cl. ............... 701/50; 414/467; 414/495
[58] Field of Search .................. 701/29, 35, 50, 701/213, 207, 1; 414/467, 480, 495; 177/139, 141, 145

[56] References Cited

U.S. PATENT DOCUMENTS

| | | | |
|---|---|---|---|
| 4,418,636 | 12/1983 | Piper | 116/28 R |
| 4,542,461 | 9/1985 | Eldridge et al. | 364/424 |
| 4,635,739 | 1/1987 | Foley et al. | 177/45 |
| 4,839,835 | 6/1989 | Hagenbuch | 701/1 |
| 5,014,206 | 5/1991 | Scribner et al. | 701/207 |
| 5,067,572 | 11/1991 | Kyrtsos et al. | 177/139 |
| 5,070,953 | 12/1991 | Kyrtsos et al. | 177/25.14 |
| 5,082,071 | 1/1992 | Kyrtsos et al. | 177/25.14 |
| 5,105,895 | 4/1992 | Kyrtsos | 177/25.14 |
| 5,105,896 | 4/1992 | Kyrtsos | 177/139 |
| 5,182,712 | 1/1993 | Kyrtosos et al. | 364/424.07 |
| 5,192,189 | 3/1993 | Murata et al. | 414/477 |
| 5,509,293 | 4/1996 | Karumanchi | 73/1 B |
| 5,878,363 | 3/1999 | Koehler | 701/50 |

*Primary Examiner*—Gary Chin
*Attorney, Agent, or Firm*—W. Bryan McPherson III

[57] ABSTRACT

The present invention is adapted to provide a method for identifying a machine dump occurrence of an earthmoving machine. The method includes determining an initial elevation of a point on the machine. The elevation of the point is then monitored to determine when a dumping threshold is exceeded. The ground speed is also monitored to determine if the machine 102 is moving at a speed indicative of dumping. When the machine speed is below a dumping speed, and the receiver 116 has exceeded a dumping threshold the machine 102 may be determined to have dumped its load.

17 Claims, 2 Drawing Sheets

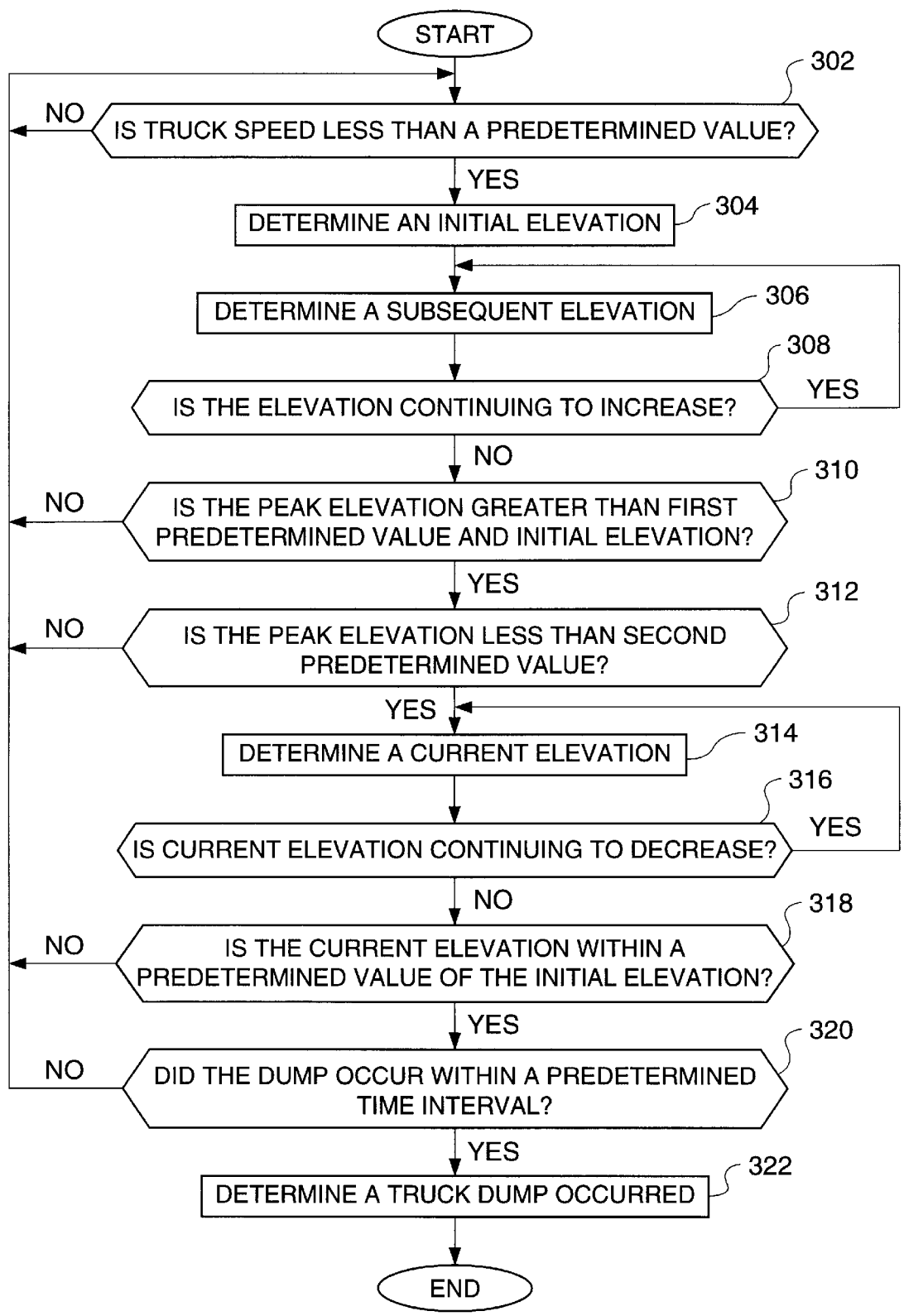

METHOD FOR DETECTING TRUCK DUMP OCCURRENCES

TECHNICAL FIELD

The present invention relates generally to a dump cycle of an earth moving machine, and more particularly, to a method for identifying a machine dump occurrence of an earthmoving machine.

BACKGROUND ART

Detection of truck dump occurrences has typically been done using expensive equipment added specifically for that purpose. For example, sensors may be added that detect the position of the hydraulic cylinder that raises and lowers the truck body. Alternatively, sensors may be added to detect the proximity of the truck body to the truck frame. Other systems, such as payload monitoring systems, use sensors that measure the weight of the truck body to determine if the body is full or empty. These types of sensors and systems add cost to a machine and may decrease the reliability of the machine. Additionally, the sensors and systems must be read as an input to any information or control system that needs to make use of the detection of the truck dump. A truck dump monitoring system is needed that can utilize hardware and software that already resides on the truck, such as vehicle tracking systems.

The present invention is directed to overcoming one or more of the problems set forth above.

DISCLOSURE OF THE INVENTION

In one aspect of the present invention, a method for identifying a machine dump occurrence of an earthmoving machine is disclosed. The earthmoving machine has a body and a frame. The method includes the step of determining an initial elevation of a point on the machine body. A machine dump occurrence is identified when a subsequent elevation of the point increases by a first predetermined elevation.

BRIEF DESCRIPTION OF THE DRAWINGS

FIG. 3 shows a flowchart illustrating the method of the present invention.

BEST MODE FOR CARRYING OUT THE INVENTION

Figure 1:
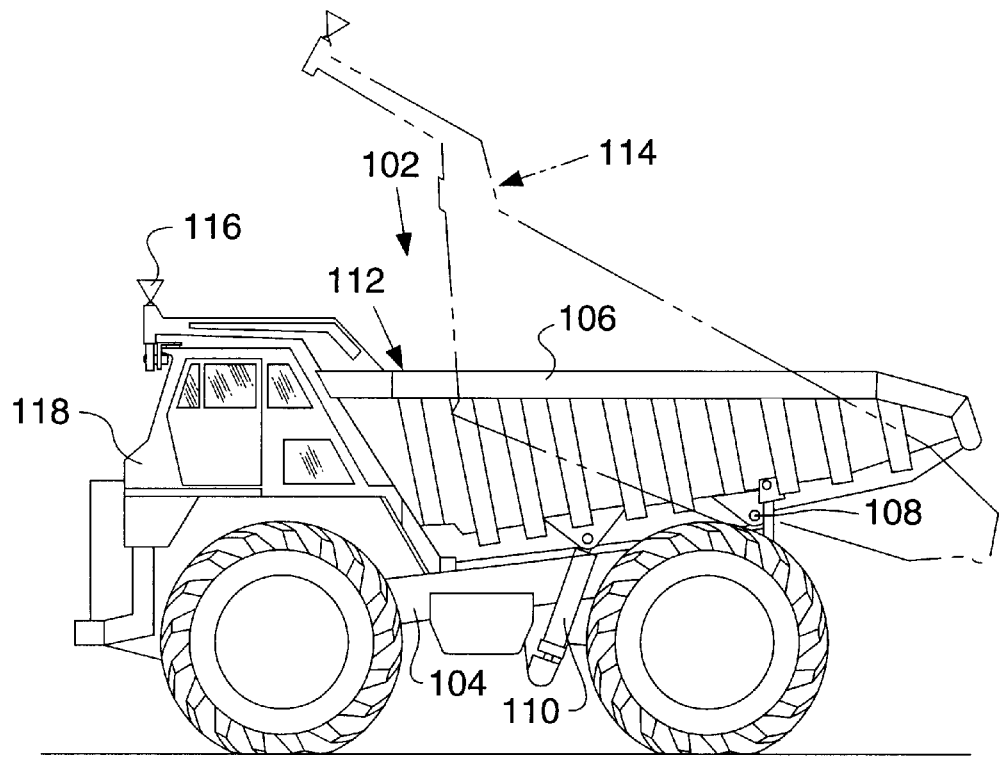
FIG. 1 is a side elevational view of an earthmoving machine having an embodiment of the present invention.

With reference to FIG. 1, the present invention provides a method for identifying a machine dump occurrence by an earthmoving machine 102 having a body 106 and a frame 104. The earthmoving machine 102 may be manually, autonomously, or semi-autonomously operated to traverse a land site. Although the earthmoving machine 102 is shown as a dump truck, other types of material hauling machines may be substituted without departing from the spirit of the invention.

The machine 102 includes a frame 104, and body 106. The machine 102 may include a cab 118. The body 106 is connected to the frame 104 by a pivot pin 108 and a hydraulic cylinder 110 such that the contents of the body 106 can be removed by controllably pressurizing the cylinder 110 to effect pivotal movement of the body 106 about the pivot pin 108. The body 106 pivots between a material hauling position 112 and a dumping position 114.

Figure 2:
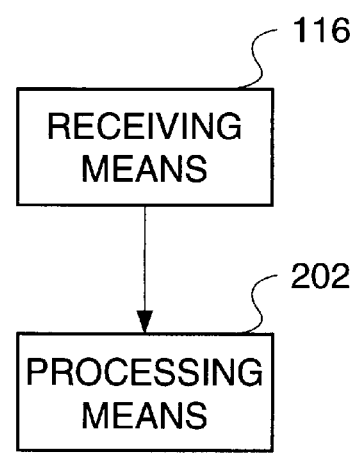
FIG. 2 is a block diagram of the receiving means and processing means of the present invention.

The present invention includes a receiving means 116 for receiving a position determining signal from a remote location. In one embodiment, the position determining signal may be an electromagnetic radiation signal. In the preferred embodiment the receiving means 116 includes a GPS receiver having an antenna and a pre-amplifier (not shown). The antennae of the receiving means 116 is located near the cab portion of the machine body 106, as illustrated in FIG. 1. Position determining signals are received by the antenna of the receiving means 116. In one embodiment, the receiving means 116 produces a position signal which represents in real time the instantaneous position of the antennae in three-dimensional space and delivers the position signal to a processing means 202, as shown in FIG. 2. A processing means 202 determines the position of the point on the body 106 where the antennae is located. The position includes the elevation of the antennae of the receiving means 116 Global position systems such as this are known to those skilled in the art and have been used within vehicle tracking systems, and will therefore not be discussed in any greater detail.

In an alternative embodiment the receiving means is a laser receiver connected to the machine body 106. The laser receiver receives the position determining signal and responsively produces a position signal. The processing means 202 determines the position of the receiving means 116 on the machine body based on the position signal.

The processing means 202 receives the position signal and responsively determines when a machine dump occurs. A machine dump is characterized by the elevation of the machine body 106 increasing from a material hauling position 112, at least a predetermined amount, to a dump position 114, and then, returning to the material hauling position 112.

One embodiment of a method for identifying a machine dump occurrence by an earthmoving machine includes the steps of determining an initial elevation of a point on the machine body 106, and identifying the machine dump occurrence when a sensed subsequent elevation of the point increases by a predetermined elevation. In the preferred embodiment, the point is the location of the antennae 116. In addition, the speed of the machine is monitored to determine if it is below a predetermined speed.

FIG. 3 illustrates one embodiment of the method of operation for the present invention. In a first decision block 302 the machine speed is determined. The machine speed is monitored to determine if the machine speed is less than a predetermined speed, e.x., 2 miles per hour. In order to perform a dumping a machine 102 will be moving very slowly, if at all. In the preferred embodiment the machine 102 is not moving at all. The machine speed may be checked at any point during the dumping cycle. In the preferred embodiment the speed of the machine 102 is determined by analyzing multiple position determining signals. For example, a GPS signal may be used to determine the position of the machine 102. Multiple GPS signals may be used to determine multiple position updates over time, and therefore may be used to determine the speed of the machine 102. In the alternative, a machine speed sensing means (not shown) may be included on the machine 102. The machine speed sensing means senses the speed of the machine 102 and responsively generates a machine speed signal. In the one embodiment the machine speed sensing means includes a ground speed sensor. In an alternative embodiment the machine speed sensing means includes a speedometer sensor.

If the machine 102 is moving faster than the predetermined speed, then control is returned to the beginning of the method. If the machine speed is less than the predetermined speed, then control passes to a first control block 304 to determine an initial elevation of a point on the machine body 106. The elevation is determined for the point on the machine body 106 where the antennae 116 is located.

The elevation of the antennae 116 is monitored to determine when the antennae elevation begins to increase, indicating the beginning of a dump cycle. Therefore, in a second control block 306 a subsequent antennae elevation is sensed. In a second decision block 308 the subsequent antennae elevation is compared to the initial elevation to determine if the antennae 116 is increasing in elevation. If the antennae elevation is continuing to increase, control is returned to the second control block 306 to continue monitoring the elevation. If the antennae elevation has not increased, then the last elevation is considered to be the peak elevation of the antennae 116, and control passes to a third decision block 310.

The peak elevation is analyzed to determine if it is consistent with the machine body 106 being in a dumping position 114. Therefore, in the third decision block 310 the peak elevation is analyzed to determine if the peak has exceeded a relative dumping threshold. That is, a predetermined value, or dumping threshold, is added to the initial elevation to determine a relative dumping threshold. If the peak elevation of the antennae 116 exceeds the relative dumping threshold then the machine body 116 is raised high enough for a dump to have occurred, and control passes to a fourth decision block 312. If the relative dumping threshold was not exceeded, then control returns to the beginning of the method. The dumping threshold is a value that may vary from one type of earthmoving machine to another.

In the fourth decision block 312 the peak elevation is analyzed to determine if the peak exceeded a maximum dumping threshold. That is, there is a maximum elevation the antennae 116 may be elevated due to the vertical displacement limits of the machine 102 itself. Therefore, a maximum elevation threshold is added to the initial elevation to determine a relative elevation maximum. If the peak elevation has exceeded the relative elevation maximum then the machine 102 is determined not to be dumping, and control is returned to the beginning of the method. However, if the peak elevation does not exceed the relative elevation maximum then the machine 102 may be considered to have made a dump, and, in one embodiment, a dump occurrence may be identified. However, in the preferred embodiment additional checks are performed to verify the occurrence of a dump. Therefore, control passes to a third control block 314.

The elevation of the antennae 116 of the machine 106 is monitored to determine if it returns to the initial elevation. Therefore, in the third control block 314 the current elevation of the antennae 116 is determined. In a fifth control block 316, the current antennae elevation is compared with the previous elevation to determine if the elevation is decreasing. If the antennae elevation is decreasing then control returns to the third control block 314 to continue monitoring the elevation. If the elevation is not decreasing, then the machine body 106 is determined to have returned to the initial elevation. If the current elevation is not within a predetermined value of the initial elevation, then the machine was not dumping, and the sensed elevation changes were potentially due to the machine 102 moving and traversing a hill on the land site. If the current antennae elevation is within a predetermined value of the initial elevation then control passes to a seventh control block 322 to determine if the time interval between the sensing of the initial and current elevations is consistent with the time period of a machine dump. In one embodiment, the dumping cycle may occur between 1.0 and 1.2 minutes. If the time interval between the sensing of the initial and current antennae elevation does not fall within the range, then a machine dump did not occur, and control passes to the beginning of the method. If the time interval did fall within the range, then control passes to a fourth control block and the machine dump is determined to have occurred. Control then passes to the beginning of the method to monitor for the next machine dump.

INDUSTRIAL APPLICABILITY

With reference to the drawings and in operation, the present invention is adapted to provide a method for identifying a machine dump occurrence of an earthmoving machine. The method includes determining an initial elevation of a point on the machine. In the preferred embodiment the location of the receiver antenna is the point being monitored. The elevation of the antennae is then monitored to determine when a dumping threshold is exceeded. The machine speed is also monitored to determine if the machine 102 is moving at a speed indicative of dumping. In the preferred embodiment the machine speed is zero. When the machine speed is below a dumping speed, and the receiver 116 has exceeded a dumping threshold the machine 102 may be determined to have dumped its load.

Determining when a machine dumps its load will enable accurate material tracking to occur. For example, when a dump occurs, the machine 102 may automatically send a signal to an on-board or off-board program that logs the time and location that machine dumps occur. The information may then be incorporated into databases to describe the material location throughout a mine site.

Other aspects, objects, advantages and uses of the present invention can be obtained from a study of the drawings, disclosures and appended claims.

I claim:

1. A method for identifying a machine dump occurrence of an earthmoving machine having a body and a frame, comprising the steps of:

determining an initial elevation of a point on the machine body; and identifying the machine dump occurrence when a sensed subsequent elevation of said point increases by a first predetermined elevation and a machine speed is less than a predetermined speed.

2. A method, as set forth in claim 1, wherein the step of identifying the machine dump occurrence further includes the step of determining said sensed subsequent elevation does not exceed a second predetermined elevation of said point, said second predetermined elevation being greater than said first predetermined elevation.

3. A method, as set forth in claim 1, wherein the step of identifying the machine dump occurrence further includes the step of determining a sensed current elevation of said point has decreased from said subsequent elevation of said point to within a predetermined value of said initial elevation of said point.

4. A method, as set forth in claim 3, wherein the step of identifying the machine dump occurrence further includes the step of determining a time period between determining said initial elevation of said point and said sensed current elevation of said point is within said predetermined value.

5. A method, as set forth in claim 1, wherein the step of determining an initial elevation of said point further includes a step of receiving a position determining signal from a remote location.

6. A method, as set forth in claim 1, wherein the step of identifying the machine dump occurrence further includes the step of determining a sensed current elevation of said point has decreased from a previous elevation of said point to within a predetermined value of said initial elevation of said point.

7. A method, as set forth in claim 6, wherein the step of identifying the machine dump occurrence further includes the step of determining a time period between determining said initial elevation of said point and determining said sensed current elevation of said point is within a predetermined time period.

8. A method, as set forth in claim 6, wherein the step of determining an initial elevation of said point further includes a step of receiving a position determining signal from a remote location.

9. A method for identifying a machine dump occurrence of an earthmoving machine having a frame and a body, comprising the steps of:

determining an initial elevation of a point on the machine body;

identifying the machine is in a dumping position when a sensed subsequent elevation of said point increases by a first predetermined elevation and does not exceed a second predetermined elevation, and a machine ground speed is less than a predetermined value, said second predetermined elevation being greater than said first predetermined elevation; and identifying a machine dump occurrence when a sensed current elevation of said point decreases within a predetermined range of said initial elevation of said point.

10. A method for identifying a machine dump occurrence of an earthmoving machine having a frame and a body, comprising the steps of:

receiving an initial position determining signal from a remote location, and responsively determining an initial elevation of a point on the machine body;

identifying the machine is in a dumping position when a sensed subsequent elevation of said point, determined in response to receiving a subsequent position determining signal, increases by a first predetermined elevation and does not exceed a second predetermined elevation, and a machine speed is less than a predetermined value, said second predetermined elevation being greater than said first predetermined elevation; and identifying a machine dump occurrence when a sensed current elevation of said point, determined in response to receiving a current position determining signal, decreases within a predetermined range of said initial elevation of said point.

11. A method, as set forth in claim 10, wherein the step of receiving said initial position determining signal further includes a step of receiving an electromagnetic radiation signal.

12. A method for identifying a machine dump occurrence of an earthmoving machine having a body and a frame, comprising the steps of:

determining an initial elevation of a point on the machine body; and identifying the machine dump occurrence when a sensed subsequent elevation of said point is greater than a relative dumping threshold and a machine speed is less than a predetermined speed.

13. A method, as set forth in claim 12, including the steps of:

combining said initial elevation and a dump threshold; and determining said relative dumping threshold in response to said combination.

14. A method, as set forth in claim 13, further comprising the step of determining said subsequent elevation is a peak elevation.

15. A method, as set forth in claim 12, further comprising the step of determining said subsequent elevation is a peak elevation.

16. A method, as set forth in claim 12, wherein the step of identifying the machine dump occurrence further includes the step of determining said sensed subsequent elevation is less than a second threshold elevation, said second elevation being greater than said first elevation.

17. A method, as set forth in claim 16, including the steps of:

combining said initial elevation and a maximum elevation threshold; and determining said second threshold elevation in response to said combination of said initial elevation and said maximum elevation threshold.

* * * * *